J. W. WILFORD.
ELASTIC BEARING.
APPLICATION FILED MAY 6, 1915.
1,188,518.  Patented June 27, 1916.
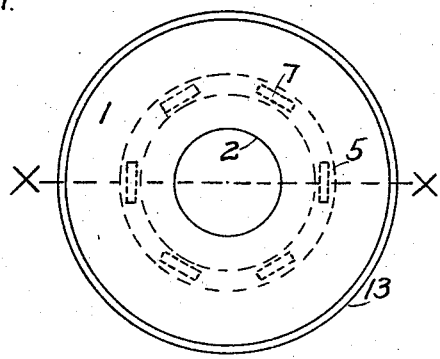
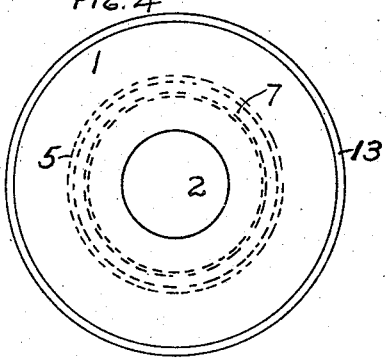
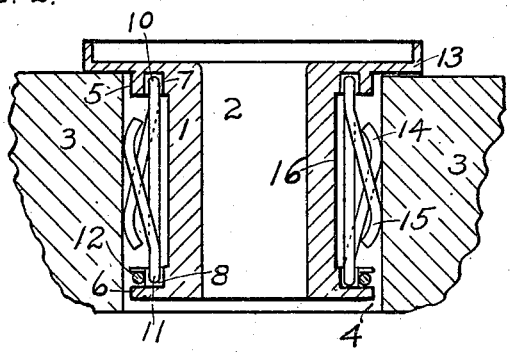
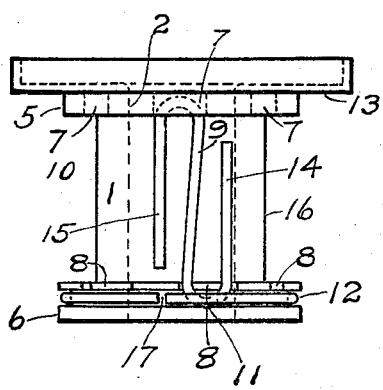
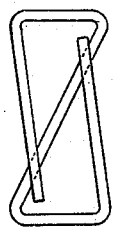
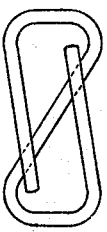
WITNESSES:
INVENTOR.
James W. Wilford
BY Clark C. Moore
ATTORNEY.

UNITED STATES PATENT OFFICE.

JAMES W. WILFORD, OF LANSING, MICHIGAN, ASSIGNOR, BY MESNE ASSIGNMENTS, TO THE SEAGER ENGINE WORKS, OF LANSING, MICHIGAN, A CORPORATION OF MICHIGAN.

ELASTIC BEARING.

1,188,518.  Specification of Letters Patent. Patented June 27, 1916.

Application filed May 6, 1915. Serial No. 26,372.

*To all whom it may concern:*

Be it known that I, JAMES W. WILFORD, a citizen of the United States, residing at Lansing, in the county of Ingham and State of Michigan, have invented a new and useful Improvement in Elastic Bearings, of which the following is a specification.

My invention relates to elastic bearings for centrifugal machines, as for example, cream separators, and its purposes are, to make a bearing that shall be simple and economical in construction, and reliable and efficient in operation, and in which the springs, if broken or defective, can be readily and inexpensively replaced by any one. I attain these purposes by the means shown in the accompanying drawings, in which—

Figure 1 is a plan view of a preferred form of my bearing, the location of the springs being indicated by dotted lines. Fig. 2 is a vertical section on the line x—x of Fig. 1. Fig. 3 is an elevation, showing one spring in position. Fig. 4 is a plan with continuous spring retaining grooves. Figs. 5, 6 and 7 show modified forms of springs.

Referring more particularly to the drawings, 1 is the main body of my device, which is preferably formed entire from one piece of metal.

2 is the bearing proper, which is adapted to receive the revolving shaft. 3 is the frame of the machine, which is provided with an opening 4 adapted to receive the bearing, leaving sufficient space around the flanges 5 and 6 to permit of the necessary vibration of the bearing in operation. A plurality of spring retaining sockets or grooves 7 are formed in the upper flange 5 and a corresponding series of notches 8 are formed in the lower flange 6. The sockets 7 are preferably formed as recesses in the horizontal face of the flange 5, but notches 8 are recessed back inwardly from the vertical or exterior face of the flange 6. Springs 9 formed of wire, substantially in the shape shown in Fig. 3, are mounted with their recurved extremities 10 and 11, respectively, each in one of the sockets 7 and the notches 8. The recurved portions 11 are retained in position in the notches 8 by a wire or other suitable removable device 12. 13 is the upper flange of the bearing, which rests on the top of the frame and is supported by it, but is free, as already stated, to vibrate with the motion of the shaft. The free extremities 14 and 15 of the springs 9 are bent outward and preferably slightly recurved toward the main body, as shown in Fig. 2, so that the curved portion of the springs will rest against the inside wall of the opening 4 in the frame near the opposite flange, thus forming two substantially parallel rows of spring contacts with the frame, as shown in Figs. 2 and 3. The main body 1 is preferably slightly recessed, as shown, at 16, between the flanges 5 and 6 so as to give the freest possible play to the elasticity of the springs 9.

In assembling my device, the upper extremities 10 of the springs 9 are first placed in the sockets 7, the lower extremities are then placed in the notches 11 and secured in position by the wire 12, which is left open, as at 17, for this purpose. It is evident that a flat spring or any other suitable device might be employed instead of the wire 12 without departing from my invention.

While I have shown and described my device in the form that seems to me preferable, it is evident that it may be varied to a considerable extent without departing from my invention. For example, the sockets 7 and the notches 8 may be widened so as to form continuous grooves or recesses in the respective flanges 5 and 6, and a sufficient number of the springs 9 may be introduced so that their extremities will contact with each other, thus avoiding the necessity for a separate socket for each spring. So too, the springs themselves may be modified, as illustrated in Figs. 5, 6 and 7. Thus in Fig. 5 the circumferentially extending portion is wider and is bent abruptly at a slightly acute angle. In Fig. 6, while the curve is retained, it is much broader, these forms being more especially adapted for use with a continuous groove as described above, instead of separate sockets. Also if desired the springs 9 may be reversed in position so that the free extremities 14 and 15 will extend inward and rest against the body 1, instead of against the opening in the frame.

I claim as my invention and desire to secure by Letters Patent:

1. A retaining device for the elastic bearing of centrifugal machines, composed of a plurality of wire springs, each of said springs having a central portion extending approximately longitudinally of said bearing and having its extremities recurved and extending in opposite directions, but out of the plane of said central portion.

2. In an elastic bearing for centrifugal machines, the combination with a main body, of a plurality of wire springs, each of said springs having a central portion extending approximately longitudinally of said main body, recurved portions adapted to engage with said main body near its opposite extremities and free extremities extending from said recurved portions toward the opposite extremities of said main body and terminating out of the plane of said central portion.

3. In an elastic bearing for centrifugal machines, the combination with a main body, of a plurality of wire springs, each of said springs having a central portion extending approximately longitudinally of said main body, recurved portions, adapted to engage with said main body near its opposite extremities and free extremities extending from said recurved portions toward the opposite extremities of said main body and terminating out of the plane of said central portion, and means for retaining said springs in position.

4. The combination with the main frame of a centrifugal machine provided with a bearing receiving opening, of a bearing body adapted to be mounted in said opening and a plurality of springs operatively mounted between said bearing body and the walls of said opening each of said springs having a central portion extending approximately longitudinally of said bearing body, and having its extremities bent backward, also approximately longitudinally of said bearing, but out of the plane of said central portion and extending toward the opposite extremities of said bearing.

5. The combination with the main frame of a centrifugal machine provided with a bearing receiving opening, of a bearing body adapted to be mounted in said opening and a plurality of springs operatively mounted between said bearing body and the walls of said opening, each of said springs having a central portion extending approximately longitudinally of said bearing body, and having its extremities bent backward toward the opposite extremities of said bearing and approximately longitudinally of said bearing, but out of the plane of said central portion, and means for retaining said springs in position.

6. The combination with the main frame of a centrifugal machine, provided with a bearing receiving opening, of a bearing body adapted to be mounted in said opening and a plurality of springs mounted between said bearing body and the walls of said opening each of said springs having a central portion extending approximately longitudinally of said bearing body and supported thereby and having its extremities recurved, also approximately longitudinally of said bearing, but out of the plane of said central portion, so that the free extremities of said springs will be in operative engagement with the walls of said opening near the opposite extremities of said bearing.

7. The combination with the main frame of a centrifugal machine, provided with a bearing receiving opening, of a bearing adapted to be mounted in said opening and a plurality of springs operatively mounted between said bearing body and the walls of said opening, each of said springs having a central portion extending approximately longitudinally of said bearing body and supported thereby, and having its extremities recurved, also approximately longitudinally of said bearing body but out of the plane of said central portion, and means for retaining said springs in position, so that the free extremities of said springs will be in operative engagement with the walls of said opening.

8. The combination with the main frame of a centrifugal machine, provided with a bearing receiving opening, of a bearing body adapted to be mounted in said opening and a plurality of springs operatively mounted between said bearing body and the walls of said opening, each of said springs having a central portion extending approximately longitudinally of said bearing body and supported thereby and having its extremities recurved, also approximately longitudinally of said bearing body, but out of the plane of said central portion, and means for releasably retaining said springs in position, so that the free extremities of said springs will be in operative engagement with the walls of said opening.

9. The combination with the main frame of a centrifugal machine, provided with a bearing receiving opening, of a bearing body adapted to be mounted in said opening and a plurality of springs operatively mounted between said bearing body and the walls of said opening, each of said springs having a central portion extending approximately longitudinally of said bearing body and supported thereby, and having its extremities recurved, also approximately longitudinally of said bearing body, but out of the plane of said central portion, said bearing body being provided with recesses formed near its extremities for retaining said springs in position, so that the free extremities of said springs will be in operative engagement with the walls of said opening.

10. The combination with the main frame of a centrifugal machine, provided with a bearing receiving opening, of a bearing body adapted to be mounted in said opening, and plurality of springs operatively mounted between said bearing body and the walls of said opening, each of said springs having a central portion extending approximately longitudinally of said bearing body and supported thereby, and having its extremities recurved, also approximately longitudinally of said bearing body, but out of the plane of said central portion, said bearing body being provided with recesses formed near its extremities for releasably retaining said springs in position, so that the free extremities of said springs will be in operative engagement with the walls of said opening, and the recurved extremities of said center portion in engagement with said opening body.

11. The combination with the main frame of a centrifugal machine, provided with a bearing receiving opening, of a bearing body adapted to be mounted in said opening, and plurality of springs operatively mounted between said bearing body and the walls of said opening, each of said springs having a central portion extending approximately longitudinally of said bearing body and supported thereby, and having its extremities recurved, also approximately longitudinally of said bearing body, but out of the plane of said central portion, said bearing body being provided with recesses formed near its extremities for releasably retaining said springs in position, so that the free extremities of said springs will be in operative engagement with the walls of said opening.

JAMES W. WILFORD.

Witnesses:
H. L. LAWRENCE,
M. L. VAN DEUSEN.

Copies of this patent may be obtained for five cents each, by addressing the "Commissioner of Patents. Washington, D. C."